(12) United States Patent  
Cech (10) Patent No.: US 10,800,288 B2  
(45) Date of Patent: Oct. 13, 2020

(54) SYSTEM AND METHOD FOR DETECTING MOVEMENT OF AN OCCUPANT SEATED IN A VEHICLE

(71) Applicant: TK Holdings Inc., Auburn Hills, MI (US)

(72) Inventor: Leonard Cech, Auburn Hills, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 116 days.

(21) Appl. No.: 15/852,297

(22) Filed: Dec. 22, 2017

(65) Prior Publication Data

US 2018/0178676 A1    Jun. 28, 2018

Related U.S. Application Data

(60) Provisional application No. 62/438,582, filed on Dec. 23, 2016.

(51) Int. Cl.
| | |
|---|---|
| *B60N 2/00* | (2006.01) |
| *B60R 16/023* | (2006.01) |
| *B60T 7/14* | (2006.01) |
| *G01V 3/12* | (2006.01) |
| *B60N 2/427* | (2006.01) |

(Continued)

(52) U.S. Cl.
CPC ........... *B60N 2/002* (2013.01); *B60N 2/4279* (2013.01); *B60R 16/023* (2013.01); *B60T 7/14* (2013.01);

(Continued)

(58) Field of Classification Search
CPC .... B60N 2/002; B60N 2/4279; B60R 16/023; B60R 21/01542; B60T 7/14; B60T 7/22;

(Continued)

(56) References Cited

U.S. PATENT DOCUMENTS 6,329,913 B1 * 12/2001 Shieh ................ B60R 21/01532  
                                                                 340/438  
6,378,900 B1 * 4/2002 Stanley .................. B60N 2/002  
                                                                 280/735

(Continued)

OTHER PUBLICATIONS

International Search Report dated Apr. 16, 2018 issued in PCT/US2017/068276.  
Written Opinion dated Apr. 16, 2018 issued in PCT/US2017/068276.

*Primary Examiner* — Courtney D Heinle  
(74) *Attorney, Agent, or Firm* — Gordon Rees Scully Mansukhani, LLP (57) ABSTRACT

A proximity detection system for detecting motion and proximity of an occupant seated in a vehicle. The system includes a sensing electrode located proximate to the occupant and configured to transmit a signal representative of a current in the sensing electrode. The system includes a receiver including a controller and coupled to an antenna. The receiver is configured to detect a change in the transmitted signal received by the antenna based on the proximity of the occupant. The receiver is configured to determine the presence of the occupant based on the amplitude of the signal received by the antenna and the rate change of the amplitude of the signal received by the antenna. The receiver is configured to generate a control signal to change a state of a vehicle component when at least one of the amplitude and the rate of change of the amplitude exceed a predetermined threshold.

19 Claims, 4 Drawing Sheets

(51) Int. Cl.
  *B60T 7/22* (2006.01)
  *B60T 8/17* (2006.01)
  *B60W 30/00* (2006.01)
  *G01V 3/02* (2006.01)
  *B60R 21/015* (2006.01)

(52) U.S. Cl.
  CPC .................................. *B60T 7/22* (2013.01); *B60T 8/17* (2013.01); *B60W 30/00* (2013.01); *G01V 3/02* (2013.01); *G01V 3/12* (2013.01); B60R 21/01542 (2014.10); *B60T 2201/022* (2013.01); *B60T 2220/04* (2013.01); *B60T 2270/406* (2013.01)

(58) Field of Classification Search
  CPC .. B60T 8/17; B60T 2201/022; B60T 2220/04; B60T 2270/406; G01V 3/12; G01V 3/02; B60W 30/00
  See application file for complete search history.

(56) References Cited

U.S. PATENT DOCUMENTS

| | | | |
|---|---|---|---|
| 7,102,527 B2* | 9/2006 | Shieh | B60N 2/002 180/273 |
| 2007/0206836 A1* | 9/2007 | Yoon | G06K 9/00362 382/104 |
| 2008/0065291 A1* | 3/2008 | Breed | B60N 2/002 701/36 |
| 2008/0186034 A1* | 8/2008 | Scheckenbach | B60N 2/002 324/679 |
| 2010/0188242 A1* | 7/2010 | Petereit | B60N 2/002 340/667 |
| 2015/0253753 A1* | 9/2015 | Bennett | G06F 3/0488 700/83 |
| 2018/0022233 A1* | 1/2018 | Maguire | B60N 2/002 701/46 |

* cited by examiner

PRIOR ART

SYSTEM AND METHOD FOR DETECTING MOVEMENT OF AN OCCUPANT SEATED IN A VEHICLE

CROSS REFERENCE TO RELATED APPLICATION

This application claims priority to and the benefit of U.S. Provisional Patent Application No. 62/438,582, filed Dec. 23, 2016. The foregoing provisional application is incorporated by reference herein in its entirety.

BACKGROUND

The present application relates generally to the field of capacitive proximity detection systems.

In-vehicle detection systems use various technologies to detect a presence of an occupant in a vehicle and movement of the occupant in the vehicle.

However, there remains a need for an in-vehicle detection system with increased capabilities to detect the movement of the occupant and change a state of a vehicle component based on the detected movement of the occupant.

BRIEF DESCRIPTION OF THE DRAWINGS

These and other features, aspects, and advantages of the present invention become apparent from the following description and the accompanying exemplary embodiments shown in the drawings, which are briefly described below.

DETAILED DESCRIPTION

As described herein, a system is disclosed that provides for detecting and estimating an person's intention to approach and touch a button and/or actuator surface with an appendage such as a finger, hand or foot. The system senses the occupant prior to contact with the surface and also tracks the approach and/or withdrawal of the occupant. As disclosed, the system employs a low power electric or electromagnetic field transmitted through and from the person based on the occupant's location in a confined space such as, for example, the occupant compartment of a vehicle. Changes in the electric field are detected to determine the presence of the occupant and an appendage. Several methods and systems are proposed to determine whether an appendage of an occupant seated in a vehicle seat is proximate to a receiver.

According to an exemplary embodiment, the disclosed proximity detection system works with an capacitive type occupant detecting system that includes a sensing electrode located close to the occupant such as, for example, in a vehicle seat. The occupant detection system employs electric field or capacitive sensing to determine and discriminate the presence of an occupant in a seat. The disclosed proximity sensing system uses the electric field of the detection system to provide additional proximity sensing capability.

In particular, the proximity sensing system uses the body of the occupant as a conductive conduit and provides a receiver to detect movement of the occupant in the vehicle seat and to provide a corresponding change of a state of a vehicle component based on the occupant's movement. Thus, the overall sensing system includes a seat integrated capacitive sensing system for detecting a presence of the occupant and a capacitive proximity detection system for detecting movement of the occupant seated in the seat.

Figure 1:
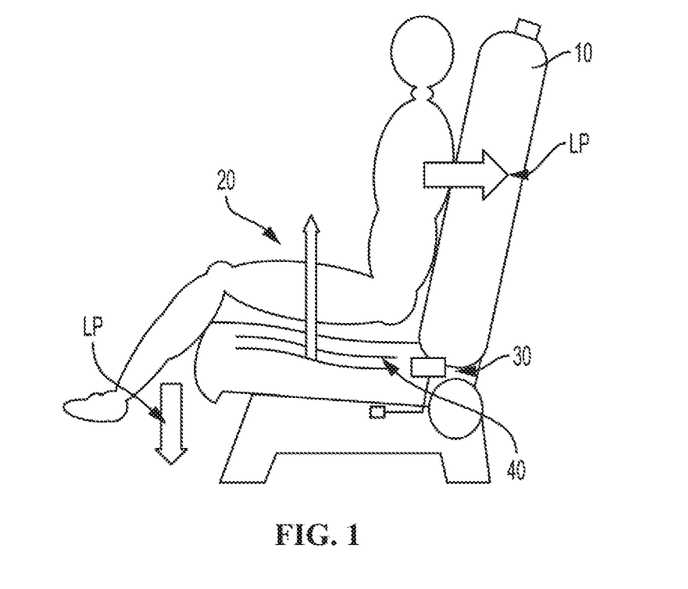
FIG. 1 is a schematic side view of an occupant in a vehicle seat including a capacitive sensing system.

As shown in FIG. 1, a capacitive sensing system may include a sensing electrode 40 located in a vehicle seat 10. The sensing electrode 40 may be located in a driver seat of the vehicle or a passenger seat of the vehicle. The sensing electrode 40 is connected to electronics located in a housing 30. The electronics includes a signal generator that provides a voltage signal to the sensing electrode 40. The voltage signal may be but is not limited to a sinusoidal signal. Due to the applied voltage, a current flows in the sensing electrode 40. The current in the electrode creates a corresponding electrical field in the vicinity of the sensing electrode 40. The interaction between surrounding objects and the electric field changes the effective impedance of the sensing electrode 40 and accordingly current in the sensing electrode 40 can change due to the presence of objects in the vicinity of the electric field (e.g., an occupant in the vehicle).

As shown in FIG. 1, the electric field signal resulting from the signal applied to the sensing electrode 40 may cause a signal or current to flow from the sensing electrode 40 through the occupant 20 to ground. For example, the electric field signal is transmitted through the body of the occupant 20, if present, and is shunted off to ground through various leak paths (LP). The sensing electrode 40 transmits the electric field signal over a frequency less than 25 Mhz. The sensing electrode 40 may also adjust a power level of the transmitted electric field signal based on an estimated impedance of the occupant 20. The system includes electronics that can measure the resultant electric field signal transfer or coupling as a change in amplitude and phase based on the strength of the coupling through the body.

The system may employ a sensing, detection and classification system such as described in U.S. Pat. No. 8,818,637, which is incorporated by reference herein. Preferably, the capacitive sensing system sends a time varying voltage out to the sensing electrode and measures the loading current to ground from the sensing element. The time varying voltage may take many shapes, although a preferred shape is a sinusoidal signal at frequencies between about 50 kHz and about 150 kHz. This loading current increases significantly when an adult occupant is on the seat and only slightly when there is a child seat on the vehicle seat.

The occupant detection system may utilize a measurement system that measures the in-phase (I) and quadrature (Q) components of the current supplied to the sensing electrode. With such a measurement system, separation remains between the adult and the RFIS/wet situation. Thus, the sensor system can distinguish between an adult and an RFIS on the seat in normal and wet seat situations. Preferably, the system and methods disclosed herein use the I and Q measurements, seal the sensing electrode from direct contact with the seat foam of the vehicle seat, and ensure that the seat structure is grounded to allow separation between the RFIS, wet seat and normally seated adult detection cases.

Embodiments of the system can use both the I and Q measurements measured by a current measurement circuit, which sends the I and Q measurements to a microprocessor, to make a classification of the occupant during wet seat situations because the nature of the impedance to ground changes when the seat is wet. Without both I and Q, there would be overlap between the RFIS (rear facing infant seat or infant cases) and small adults (the "standard small adult" are referred to as "5th %" cases, which are occupants approximately 108 lbs.). With I and Q measurements, there is a recognized separation between the RFIS cases and the small adult cases.

Figure 2:
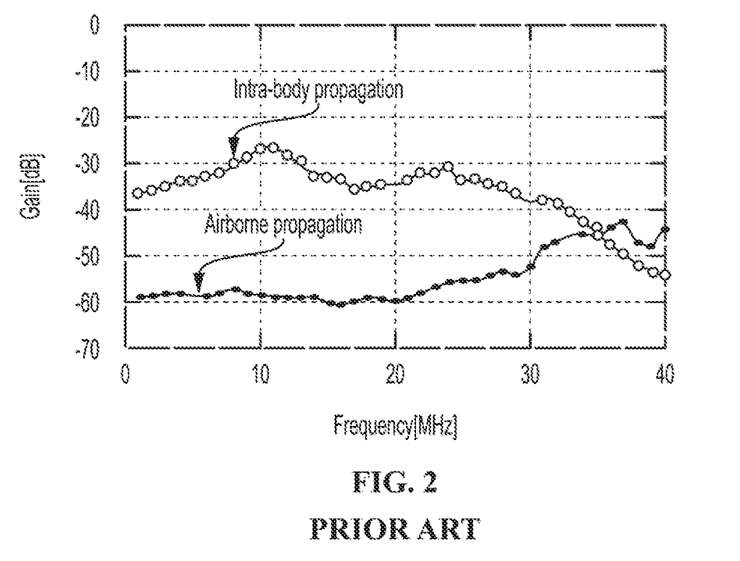
FIG. 2 is a comparison of intrabody electric field propagation and airborne electric field propagation.

FIG. 2 is a graph of intrabody electric field propagation and airborne electric field propagation. At signal frequency ranges between 30 and 40 MHz, the propagation of the signal in the air and through the body are very similar.

Figure 3:
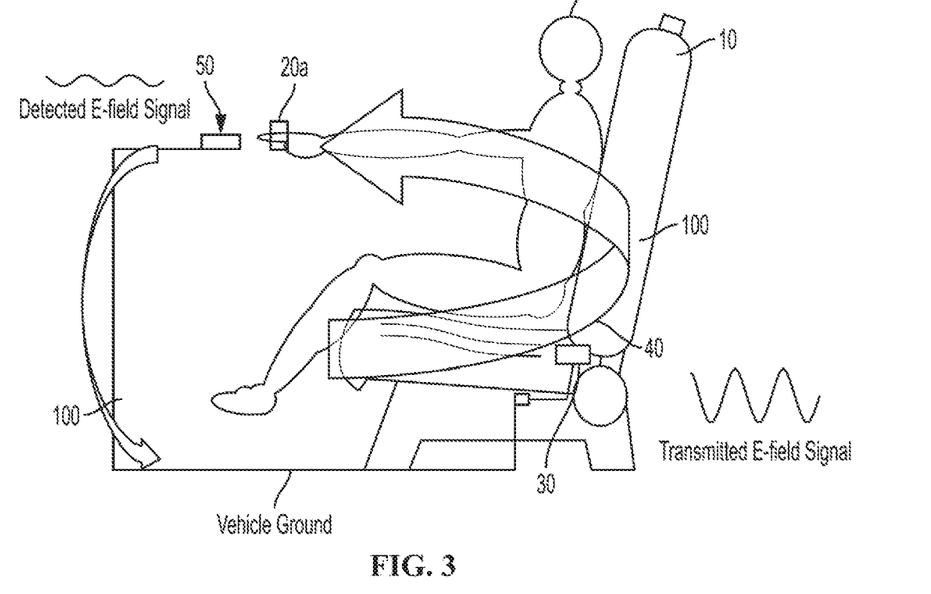
FIG. 3 is a schematic side view of the occupant in the vehicle seat of FIG. 1 further including a capacitive proximity detection system.

As shown in FIG. 3, a capacitive proximity detection system is provided including a receiver 50 to detect an appendage 20a of the occupant 20. The capacitive sensing system is used in conjunction with the capacitive proximity detection system. The electric field signal supplied to the sensing electrode 40 is shunted off through various ground paths, and may also be detected at the antenna and receiver 50 of the capacitive proximity detection system. As shown in FIG. 3, there is a conductive path (leakage path 100) provided from the sensing electrode 40 through the receiver 50 and back to the processing electronics. The embodiments disclosed herein employ various methods and systems that utilize analyzing the characteristics of the current at a number of locations (e.g., current detected by the receiver 50, current in the sensing electrode 40, etc.) in the leakage path 100 to detect the presence and movement of the occupant 20 and change a state of a vehicle component based on the detected movement of the occupant 20. Thus, the processing electronics and/or the receiver 50 may be configured to utilize one or more measures relating to the current, capacitance, or impedance in the system (e.g., current at the receiver 50 or current at the electrode 40) to detect the presence and/or movement of the occupant.

The receiver 50 may include a controller and antenna. The antenna may be integrated into the receiver or may be a separate component coupled to the receiver. The antenna may be, for example, configured in a suitable shape to match the configuration of the vehicle. For example, the antenna may be integrated into the vehicle instrument panel and may be a rectangular, circular or oval shape. The receiver 50 may be utilized to detect a change in the electric field signal originating from the sensing electrode 40. The field is generated due to the applied voltage to the sensing electrode 40. The electric field signal is affected by the presence of the occupant 20. The signal provided to the electrode 40 may be transmitted through the occupant and received by the antenna when the occupant is located in proximity to the antenna. The signal is transmitted via an electric field located proximate to the occupant.

Figure 4:
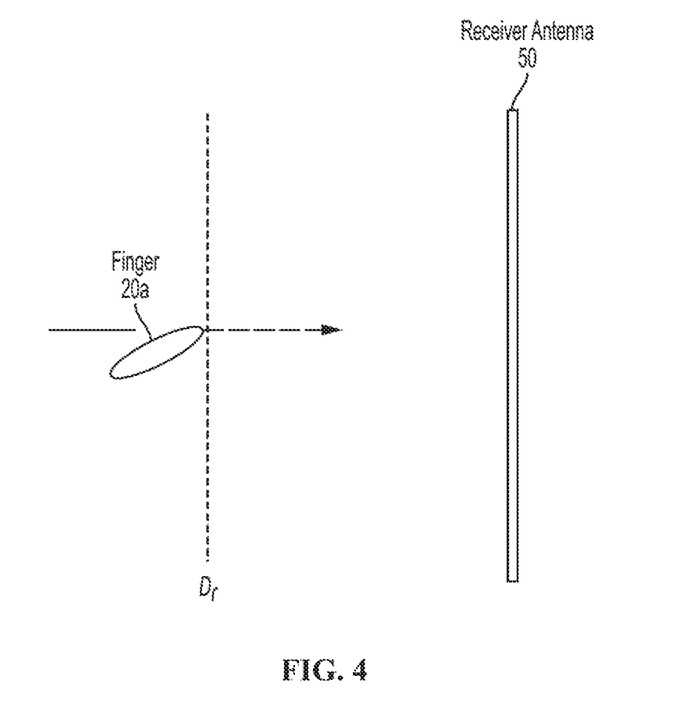
FIG. 4 is a schematic of proximity detection of an appendage of the occupant.

As shown in FIG. 4, the receiver 50 is may be configured to detect a change in the transmitted electric field signal. The receiver 50 may be configured to monitor for a change in the electric field that occurs due to a number of different conditions. For example, the change in electric field may be due to one or more of the following: the size of the occupant's appendage 20a, an approaching rate of speed of the occupant's appendage 20a to the receiver 50, a withdrawal rate of speed of the occupant's appendage 20a from the receiver, or a distance between the occupant's appendage 20a and the receiver 50. The occupant's appendage 20a may be, for example, any one of a hand, finger, foot and toe.

Figure 5A:
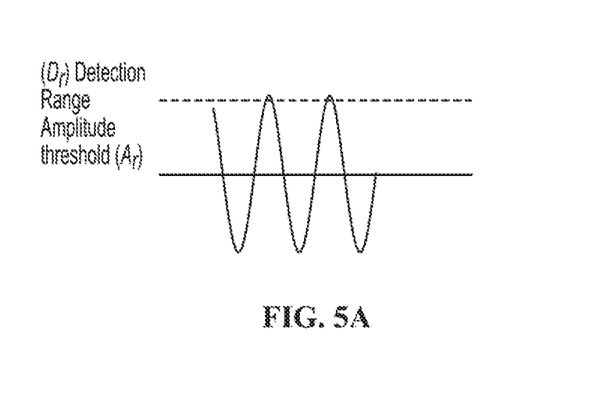
FIG. 5A is a graph showing the amplitude of the detected electric field signal over time, and a threshold corresponding to a range of the occupant's appendage from the antenna detecting the signal.
Figure 5B:
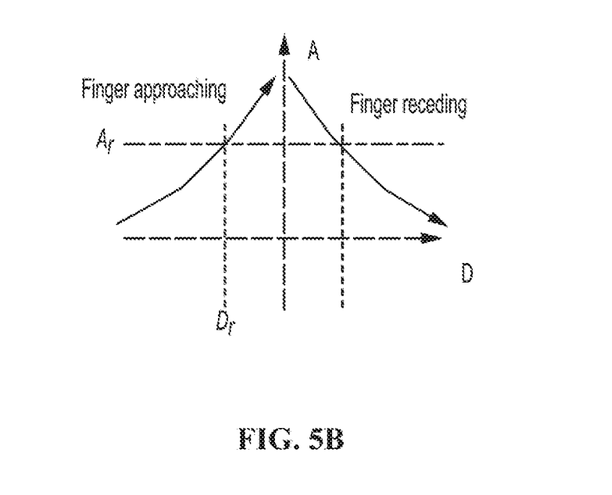
FIG. 5B is a graph of the amplitude of the detected electric field signal over distance from the antenna detecting the signal and the graph including the amplitude threshold of FIG. 5B and a detection range for the approach and receding appendage of the occupant.

As shown in FIG. 5A, the detection of the occupant may be determined based on an amplitude threshold of the electric field signal which may be associated with a detection range between the occupant's appendage 20a and the receiver 50.

In another embodiment, the detection condition may be set according to both the approaching rate of speed $\dot{D}_r$ of the occupant's appendage 20a (e.g., finger) and a detection range $D_r$ between the occupant's appendage 20a and the antenna and/or receiver 50. For example, as shown in FIG. 4, the approaching rate of speed $\dot{D}_r$ of the occupant's appendage 20a is 50 cm/sec and the detection range $D_r$ is 10 cm. Thus, the receiver may be configured to identify when the change in the electric field indicates that a predetermined set point associated with one of the monitored conditions has occurred. Thus, when the receiver (which may include a controller) or the processing electronics (i.e., a remote controller) has determined that the touch of the occupant to a point in proximity to the antenna is imminent, a control signal may be generated. The imminent touch may be determined by considering one or more of the conditions being monitored such as, for example, the combination of detection range and approach rate. As shown in the example of FIG. 4, the time from surface touch can be detected to be 0.20 seconds. Thus, the system has 0.20 seconds to wake up or configure the device (e.g, HMI device, actuator, system controller) prior to touch.

As shown in FIG. 4, when the approaching rate of speed $\dot{D}_r$, of the occupant's appendage 20a is 50 cm/sec and the detection range $D_r$ is 10 cm, the receiver 50 or processing electronics calculates as the detection information, a time from a surface touch $t_r$ of the receiver 50 by the occupant's appendage 20a. In the above example the receiver calculates the time from a surface touch $t_r$ as 0.20 seconds. Accordingly, after the receiver or electronics have calculated that a setpoint has been met, a control signal may be generated.

The control signal, optionally generated by the receiver, may direct a change of state of a vehicle component. In one embodiment, the controller may change the state of the vehicle component by changing a state of a human machine interface, executing a wake up function, executing a pre-power function and/or adjusting the vehicle component. In addition, the controller may also change a state of the vehicle component based on whether the occupant is one of a driver and a passenger. Thus, the system for detecting the approach of the occupant's appendage may be coupled with a system for determining the presence of an occupant. The systems may utilize electrodes located in the vehicle seats for the driver and the passengers in order to discriminate between the different occupants of the vehicle.

The receiver 50 may be further configured to store the history of detection information and determine an occupant 20 behavior pattern by setting the detection condition based on the stored detection information. The receiver 50 may determine a state of the occupant 20 based on the stored detection information.

According to one embodiment, the receiver may be associated with a vehicle braking system and includes an antenna located in, for example, the brake pedal or braking actuator. The detection system may be configured to detect the driver's foot so that the system may estimate and optimize braking based on the approaching rate of speed of the foot and the distance between the foot and the brake. Similarly, the receiver may be associated with other actuators associated with vehicle systems such as, for example, the vehicle's acceleration or throttle pedal. Thus, the associated system (e.g., braking or throttle system) can be controlled to optimize vehicle performance. For example, if the foot is approaching the brake pedal at an unusually high speed or rate, the system may anticipate an emergency braking situation. The system may track, monitor and use foot motion time history relative to the pedal surface to optimize performance. The time history profile may change based on the individual operating the pedal. Differences may include, for example, foot size, reaction time and driver aggressiveness. The history profile of a certain operator may be used to enhance the safety, comfort and convenience of the vehicle and its associated operation.

As an example for the braking system, based on the control signal received from the proximity detection system, a braking system control may operate to direct the braking system to provide dynamic brake support or crash imminent braking. For example, if the proximity detection system indicates that the driver is about to apply inadequate or inappropriate braking, the braking system controller could operate to automatically supplement the driver's braking in an effort to avoid a crash. Further by way of example, if the proximity detection system indicates that the driver is not going to take any action to avoid a crash, crash imminent braking may be automatically directed to be applied to the vehicle's brakes by the braking system controller to slow or stop the car, thereby avoiding the crash or reducing its severity.

The time history profile based on the stored detection information may include recorded information regarding the proximity of the appendage to the antenna and the associated surface such as, for example, the button, pedal, etc. The time history may be employed to determine additional information regarding the occupant's behavior including the capability and intention of the occupant to interact with the button, pedal, etc. The time history may be analyzed to detect emergency or urgent situations by considering the high rate of movement. The occupant's indecisiveness may be ascertained by considering the dwell time of the appendage in proximity to the surface being contacted. The occupant's impairment, confusion, indecisiveness may be estimated by a corresponding slow or unpredictable rate of movement of the appendage. Thus, the disclosed proximity detection system provides additional information regarding the state and condition of the occupant.

According to another embodiment, the receiver for the proximity detection system may be located proximate to a vehicle start (i.e., ignition) button. Thus, the antenna may be, for example, embedded in or around the button. Upon the detection of an approaching finger (e.g., using distance and rate) the button may enter a "pre-power" mode and/or provide HMI feedback to the operator. For example, the button may illuminate a guide light when the finger approaches the button, and the light may be disabled when the finger moves away from the button. If a sensor, switch or actuator is incorporated in the button the system provides for enhanced operation because the sensing and actuation function of the button require reduced duration and improved sensitivity due to the advanced notice of the approaching finger provided by the proximity detection system disclosed herein. In addition, the system may be configured to carry information in the signal being transmitted through the occupant (via the seat electrode) to allow for certain operation control of the actuator. For example, the system may be configured to allow for actuation of the ignition button by the driver but not allow for actuation of the ignition button by the passenger. Discrimination between the driver and other passengers may be accomplished using the distinguishable signal being transmitted to the driver's seat electrode and through the driver's body to the vehicle start button.

Figure 6:
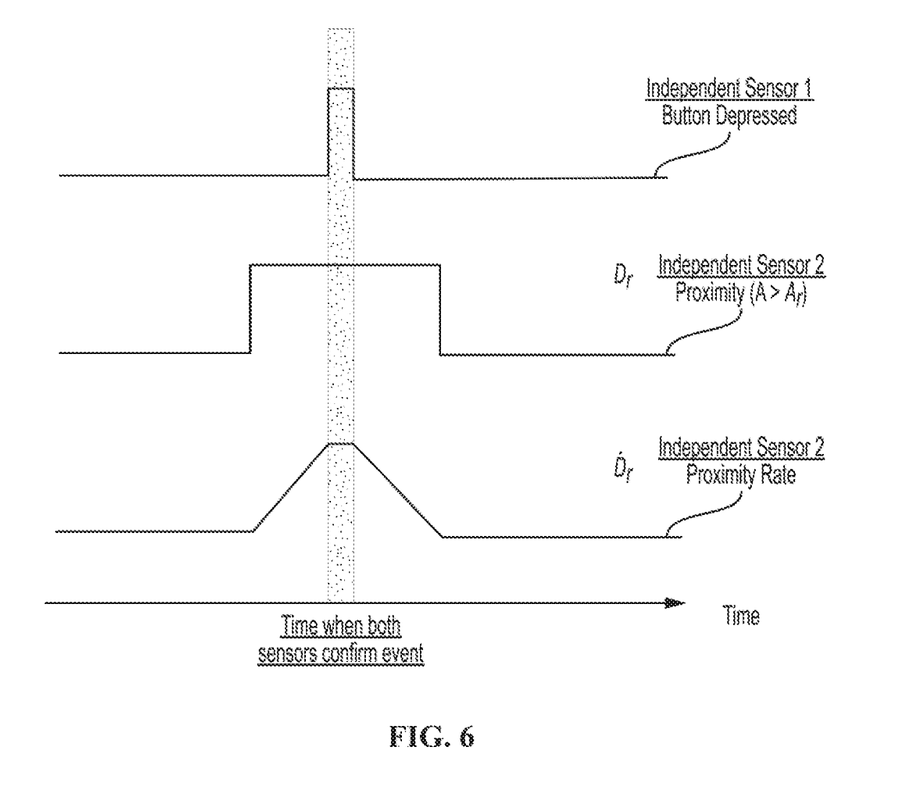
FIG. 6 is a graph depicting: (1) the on/off state change of a button; (2) the amplitude of a transmitted electric signal in excess of the amplitude threshold; and (3) rate of change of the distance of a person's appendage from an antenna.

As shown in FIG. 6, the proximity sensing system may be configured to provide enhanced safety associated with the operation of various vehicle systems. Thus, for systems that require activation of a button (i.e, changing the button or switch from "OFF" to "ON"), the proximity sensing system may provide an additional correlation of the operator or occupant's intent. For example, the proximity sensing system essentially provides a second sensor related to the activation of the button. For example, the button would not be considered to be activated unless confirmation is received from both independent sensors, where one of the sensors is associated with the proximity sensing system. Thus, for example, both movement of the button (e.g., button depressed) and the proximity sensor detecting the approaching/receding finger would be required for activation of the control associated with toggling the switch or button.

In yet another example, a receiver may be operating in cooperation with a vehicle internal display or touch screen. The touch screen console may include an antenna located around the perimeter of the console or display, for example. The antenna and receiver may be configured to track the approaching fingers/hand based on information contained within the signal and electric field being transmitted through the person. Thus, for example, the touch screen display may be directed to display certain information based on the location of the person interacting with the display (e.g., the driver or passenger). The display may be configured to display a different menu or touch screen options based on the signal detected by the antenna and processed by the receiver. As mentioned above, the electric field and signal being transmitted by and through the driver can be distinguished from the signal being transmitted through the passenger based on the signal being supplied to the seat electrodes.

A display (e.g., a touch screen) may be configured to operate based on the recorded time history of the detected signal. Thus, the receiver may be configured to track driver and passenger behavior. The detected signal may be used by the receiver to generate a control signal for the display based on past interactions of the display with the detected occupant. For example, the receiver may track (based on feedback from the display) which display menus and commands are accessed by the occupant and proactively prepare and optimize the menu screens based on the occupant detected to be approaching the display.

The signal being transmitted to the electrode in the vehicle seat, and subsequently transmitted through the occupant to the antenna may be monitored and adjusted to account for movement and interaction of the occupant with various vehicle components. For example, the characteristics (e.g., power) of the transmitted signal may be calibrated and adjusted for the electrical impedance of the occupant. The impedance of the occupant may be derived or estimated based on monitoring the phase and amplitude of the transmitted signal (via signal processing electronics or controller associated with an occupant detection system of the vehicle seat) as the occupant moves through a sequence of actions. For example, the changed in the signal characteristics for the conditions where the driver does not grasp the electrically grounded steering wheel, then is gripping the steering wheel with one hand, and then is gripping the steering wheel with both hands. The changes in the transmitted electric field signal level for these three conditions may be used to derive an estimate of the driver's impedance. An occupant's impedance is based on many different characteristics of the occupant such as, for example, size, stature, body mass index (BMI), clothing, etc. The level of the signal being transmitted to the seat electrode may be adjusted to optimize the transmitted electric field signal based on a particular occupant. The system may be configured to adjust the signal provided to the occupant sensing electrode (e.g., seat mounted electrode) based on the characteristics of the occupant detected to be in the vehicle seat.

In yet another example, a receiver of a center console display may detect a finger such that the generated detection information may execute a wake up function and restore the center console display from a stand by state. Maintaining the console and center stack electronics in a stand by state while automatically performing the wake up function may provide significantly reduced power consumption. Given the enhanced demand for vehicle electronics and power and the proliferation of hybrid and electric vehicles, the ability to provide for automatic power control and reduction features, such as provided by the system disclosed herein, provides significant advantages to vehicle manufacturers and suppliers.

In another embodiment, the receiver or processing electronics are configured to detect the withdrawal rate of speed of the occupant's appendage 20a from the receiver 50 and the detection range between the occupant's appendage 20a and the receiver 50. Accordingly, the receiver 50 generates a control signal based on when a predetermined condition is met according to the withdrawal rate of speed of the occupant's appendage 20a from the receiver 50 when the occupant's appendage 20a is other than within the detection range. The controller, based on a determination that the condition has been met, may produce a control signal to change the state of a vehicle component such as by directing feedback to an HMI device, directing a vehicle component to enter a stand by or power saving mode. Thus, the system may provide for placing certain vehicle electronics in a sleep or stand by mode in order to reduce power consumption.

Although specific shapes and locations of each element have been set forth in the drawings, each element may be of any other shape or location that facilitates the function to be performed by that element. In an exemplary embodiment, the sensing electrode 40 and receiver 50 have been shown in particular vehicle locations. However, in other exemplary embodiments the sensing electrode 40 and receiver 50 may be located anywhere in the vehicle.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to exemplary embodiments. However, persons skilled in the art will recognize that changes may be made in form and detail without departing from the spirit and scope of the disclosed subject matter. For example, although different exemplary embodiments may have been described as including one or more features providing one or more benefits, it is contemplated that the described features may be interchanged with one another or alternatively be combined with one another in the described exemplary embodiments or in other alternative embodiments. The technology of the present disclosure is relatively complex and thus not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the proximity detection system may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention may be accomplished with standard programming techniques with rule based logic and other logic to accomplish the various connection steps, processing steps, comparison steps and decision steps.

It is also important to note that the construction and arrangement of the elements of the system as shown in the exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without material departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the exemplary embodiments without departing from the spirit of the present subject matter.

What is claimed is:

1. A proximity detection system for detecting motion and proximity of an occupant seated in a vehicle, comprising:
a sensing electrode located proximate to the occupant and configured to transmit a signal representative of a current in the sensing electrode; and
a receiver including a controller and coupled to an antenna, the receiver configured to detect a change in the transmitted signal received by the antenna based on the proximity of the occupant,
wherein the receiver is configured to determine the proximity of the occupant based on the amplitude of the signal received by the antenna and the rate change of the amplitude of the signal received by the antenna, and
wherein the receiver is configured to generate a control signal in order to change a state of a vehicle component when at least one of the amplitude and the rate of change of the amplitude exceeds a predetermined threshold, and
wherein the receiver generates the control signal in order to wake-up a vehicle component from a power saving condition.

2. The system of claim 1, wherein the receiver generates the control signal in order to change the condition of an interactive display.

3. The system of claim 1, wherein the sensing electrode is located in at least one of a driver seat of the vehicle and a passenger seat of the vehicle.

4. The system of claim 1, further comprising a signal generator configured to provide a voltage signal to the sensing electrode and wherein the power of the voltage signal is adjusted based on an estimated impedance of the occupant.

5. The system of claim 1, wherein the receiver is configured to correlate the amplitude of the signal received by the antenna with the distance of the occupant from the antenna and wherein the receiver is configured to correlate the rate of change of the amplitude of the received signal with the rate at which the occupant is approaching or receding from the antenna and wherein the receiver is configured to send the control signal when both the amplitude exceeds a predetermined distance threshold and when the rate of change of the amplitude exceeds a predetermined speed threshold.

6. The system of claim 1, wherein the receiver is further configured to send the control signal based on whether the occupant is one of a driver and a passenger.

7. The system of claim 1, wherein the receiver is further configured to store historical information regarding the signal received by the antenna and wherein the receiver is configured to determine an occupant behavior pattern based on the stored historical information.

8. The system of claim 7, wherein the receiver is configured to generate the control signal based on the stored historical information.

9. The system of claim 7, further comprising a sensor configured to sense the change in position of a vehicle actuator and wherein the change in state of the vehicle component is based on both the generation of the control signal by the receiver and the change in position of the vehicle actuator.

10. A proximity detection system for detecting motion and proximity of an occupant seated in a vehicle, comprising:
a sensing electrode located proximate to the occupant and configured to transmit a signal representative of a current in the sensing electrode; and
a receiver including a controller and coupled to an antenna, the receiver configured to detect a change in the transmitted signal received by the antenna based on the proximity of an appendage of the occupant to the antenna,
wherein the receiver is configured to determine the proximity of the occupant based on the amplitude of the signal received by the antenna and wherein the receiver is configured to generate a control signal in order to wake up a vehicle component from a power saving state when the amplitude of the received signal exceeds a predetermined threshold.

11. The system of claim 10, wherein the receiver is further configured to store historical information regarding the signal received by the antenna and wherein the receiver is configured to determine an occupant behavior pattern based on the stored historical information information.

12. The system of claim 11, wherein the receiver is configured to generate the control signal based on the stored historical information.

13. The system of claim 12, wherein the receiver is configured to generate the control signal to direct a HMI device to display images based on the occupant behavior pattern determined from the historical information.

14. The system of claim 10, wherein the receiver is configured to determine the withdrawal of the occupant from the proximity of the antenna and generate the control signal to direct the vehicle component to return to the power saving state.

15. A proximity detection system for detecting motion and proximity of an occupant seated in a vehicle, comprising:
a sensing electrode located proximate to the occupant and configured to transmit a signal representative of a current in the sensing electrode; and
a receiver including a controller and coupled to an antenna, the receiver configured to detect a change in the transmitted signal received by the antenna based on the proximity of an appendage of the occupant to the antenna,
wherein the antenna is located in a control actuator for a system that controls the speed of the vehicle;
wherein the receiver is configured to determine the proximity of the occupant to the actuator based on the amplitude of the signal received by the antenna; and
wherein the receiver is configured to generate a control signal based on the proximity of the occupant to the actuator in order to change the operation of the system that controls the speed of the vehicle.

16. The system of claim 15, wherein the antenna is located in the vehicle brake pedal or the vehicle gas pedal.

17. The system of claim 16, wherein the receiver is configured to determine the proximity of the occupant to the brake pedal based on the rate change of the amplitude of the signal received by the antenna, and wherein the receiver is configured to generate a control signal in order to change a state of a vehicle component when at least one of the amplitude and the rate of change of the amplitude exceeds a predetermined threshold.

18. The system of claim 16, wherein the receiver is configured to send the control signal to a brake system controller.

19. The system of claim 17, wherein the receiver is configured to generate the control signal to be sent to a braking system controller to thereby cause the operation of the braking system to change.

\* \* \* \* \*